United States Patent [19]

Oku

[11] Patent Number: 5,402,206
[45] Date of Patent: Mar. 28, 1995

[54] FILM FEED DEVICE
[75] Inventor: Hiroshi Oku, Wakayama, Japan
[73] Assignee: Noritsu Koki Co., Ltd., Wakayama, Japan
[21] Appl. No.: 253,306
[22] Filed: Jun. 3, 1994
[30] Foreign Application Priority Data
  Jun. 4, 1993 [JP] Japan .................................. 5-134277
[51] Int. Cl.$^6$ ............................................ G03B 27/62
[52] U.S. Cl. ...................................................... 355/75
[58] Field of Search ..................................... 355/75, 76

[56] References Cited
U.S. PATENT DOCUMENTS

| | | | |
|---|---|---|---|
| 4,774,553 | 9/1988 | Blanding et al. | 355/75 |
| 4,908,657 | 3/1990 | Kogane | 355/75 |
| 5,097,292 | 3/1992 | Hicks | 355/75 |
| 5,153,639 | 10/1992 | Tahara et al. | 355/75 |
| 5,289,232 | 2/1994 | Seto | 355/75 |

Primary Examiner—Michael L. Gellner
Assistant Examiner—Daniel P. Malley
Attorney, Agent, or Firm—Wenderoth, Lind & Ponack

[57] ABSTRACT

A film feed device for feeding films connected to a leader to a negative carrier one after another. A guide block is provided at a film inlet side of the negative carrier provided along the exposure axis. Film feed units having film passage thereon are provided on the guide block. A feed unit having a pair of pulleys and a timing belt is mounted under the guide block to move the guide block in a direction perpendicular to the feed direction of the films. Ahead of the guide block is provided a cutter device to cut the two films when the rear end of the leader reaches the cutter device. The film aligned with the film inlet of the negative carrier is supplied thereto and printed. Then, by moving the guide block until the other film is aligned with the film inlet of the negative carrier, the other film can be printed.

1 Claim, 10 Drawing Sheets

FILM FEED DEVICE

This invention relates to a film feed device for use in a film printing apparatus, by which a developed film attached to a leader is fed to a negative carrier provided along the exposure axis.

Figure 11:
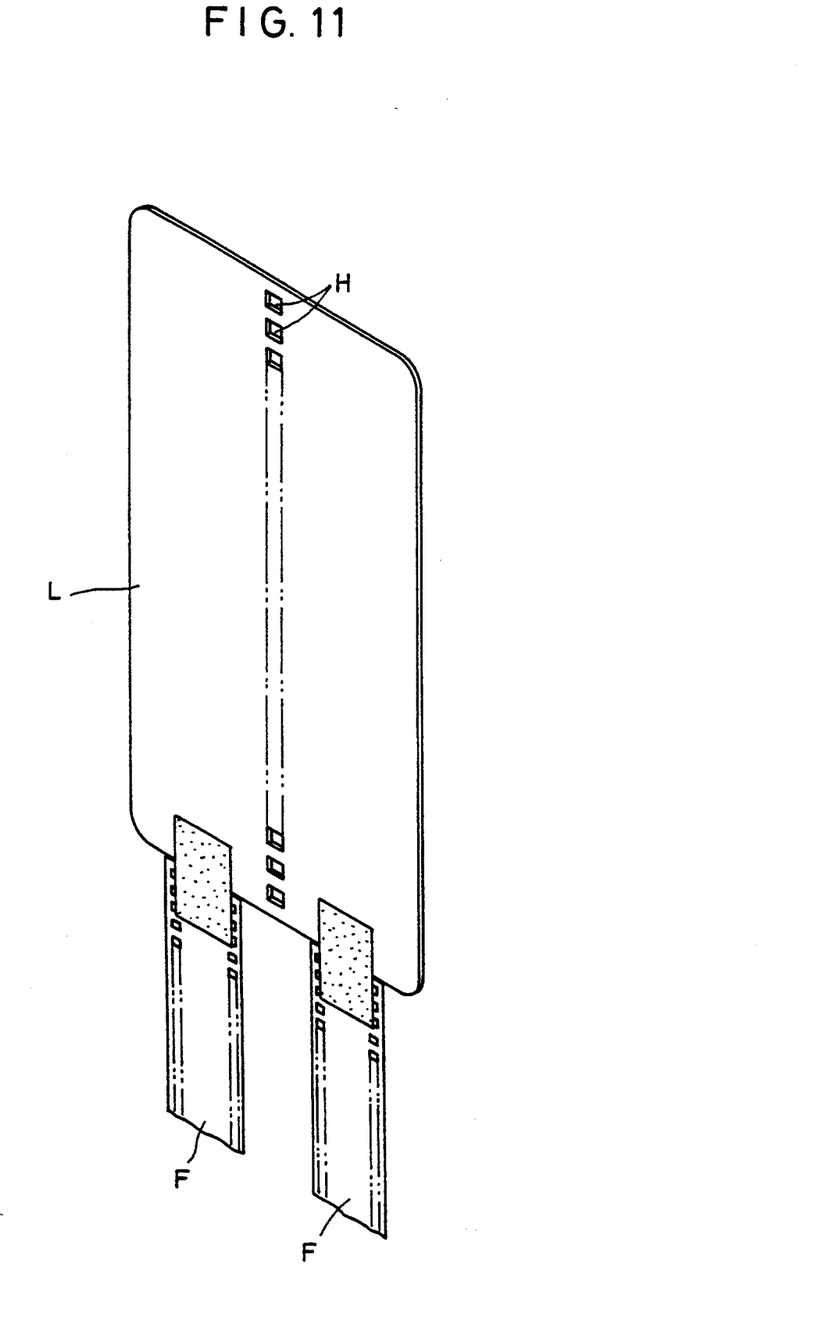
FIG. 11 is a perspective view of the leader.

In an automatic film developing machine, when a film is developed, two films F are usually connected to a leader L and fed to the automatic film developing machine with the leader L ahead (FIG. 11).

After developed in the automatic film developing machine, the films are fed to a film printing apparatus for printing.

In such a conventional film printing apparatus, since the roll of developed film was developed one by one, the film F was usually cut off from the leader L and fed to the film printing apparatus one after another to be printed. Therefore, the printing was troublesome. Also, each of the films F cut off from the leader L had to be stored.

It is an object of the present invention to provide a film feed device which can obviate abovesaid problems and which can feed the developed films to the film printing apparatus with the film connected to the leader.

According to the present invention, there is provided a film feed device for use in a film printing apparatus for feeding films attached to a leader to a negative carrier provided along an exposure axis, the film feed device comprising a guide block provided at a film inlet side of the negative carrier and formed on top thereof with two film passages extending toward the negative carrier, a plurality of feed units for feeding the films connected to the leader to the guide block, a cutter device for cutting off the films from the leader when the rear end of the leader has passed the guide block, a leader discharge means for discharging the leader cut off from the films from a film path, a film feed means for feeding the film from the film passage to the negative carrier, and a transfer means for moving the guide block in a direction perpendicular to the feed direction of the film to align one of the two film passages with the film inlet of the negative carrier.

In the film feed device according to the present invention, the leader as well as the films connected thereto are fed to the guide block. After the rear end of the leader has passed the guide block, the front ends of the two films are cut off from the leader by the cutter device. Next, the leader is discharged from the film transfer path by the leader discharge means. Then, one of the films on the film passage aligned with the film inlet of the negative carrier is fed to the negative carrier and printed. After the printing is complete, by travelling the guide block in a direction perpendicular to the feed direction of the film, the film passage supporting the other film is aligned with the film inlet. Then, the other film is fed to the negative carrier and printed.

In the film feed device according to the present invention, by feeding the developed films connected with the leader, the two films are cut off from the leader and fed to the negative carrier in turn. Therefore, the printing is carried out efficiently.

Moreover, since the guide block is moved in a direction perpendicular to the feed direction of the film while the film keeps hanging down from the guide block, even if the guide block is moved, no excessive load is applied to the film. This will protect the film against damage.

Other features and objects of the present invention will become apparent from the following description made with reference to the accompanying drawings, in which:

Figure 1:
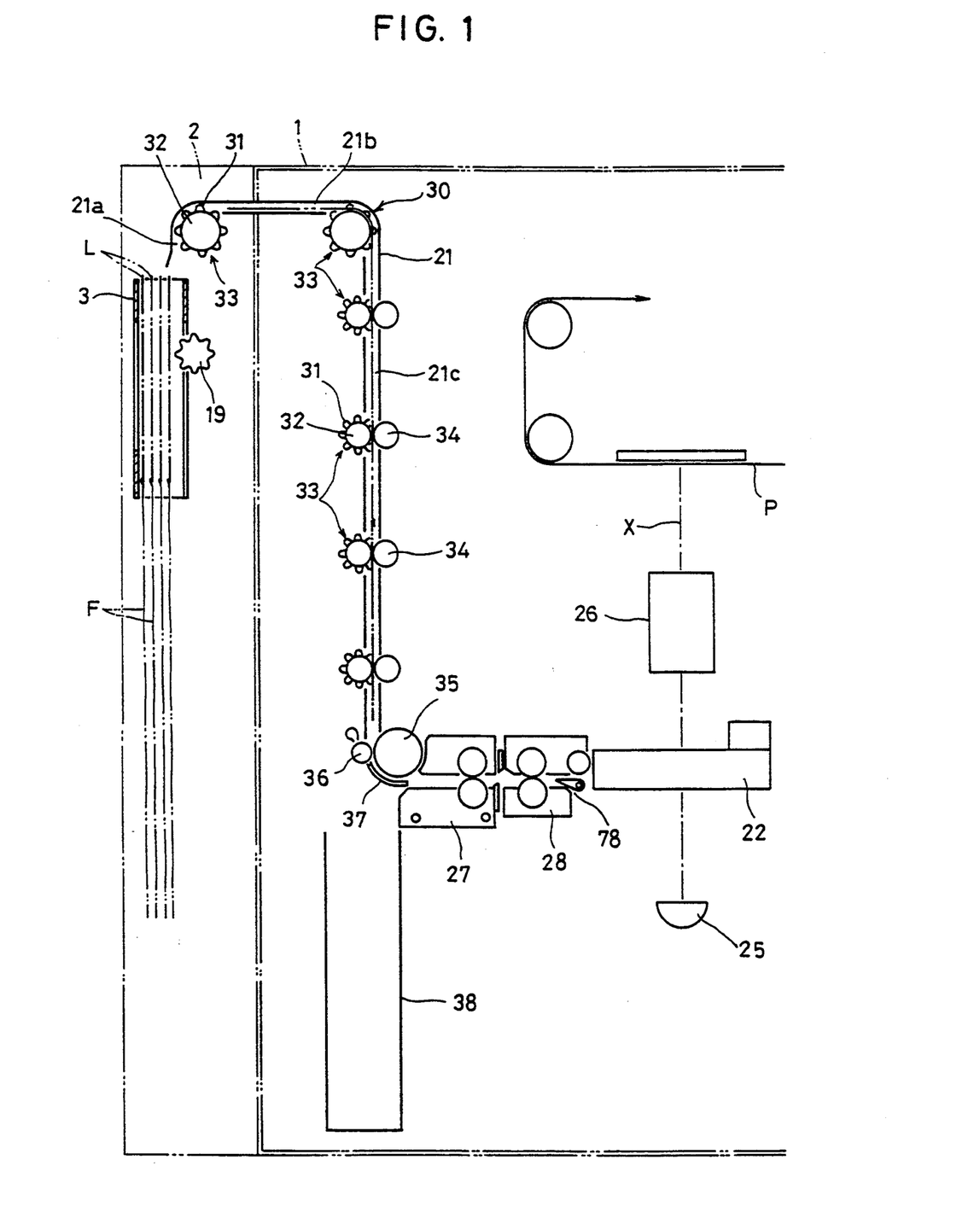
FIG. 1 is a schematic view showing one embodiment of the film feed device according to the present invention.

Referring to FIG. 1, a printer body 1 is provided on its outer surface with a recess 2 in which a leader stocker 3 is housed.

Figure 2:
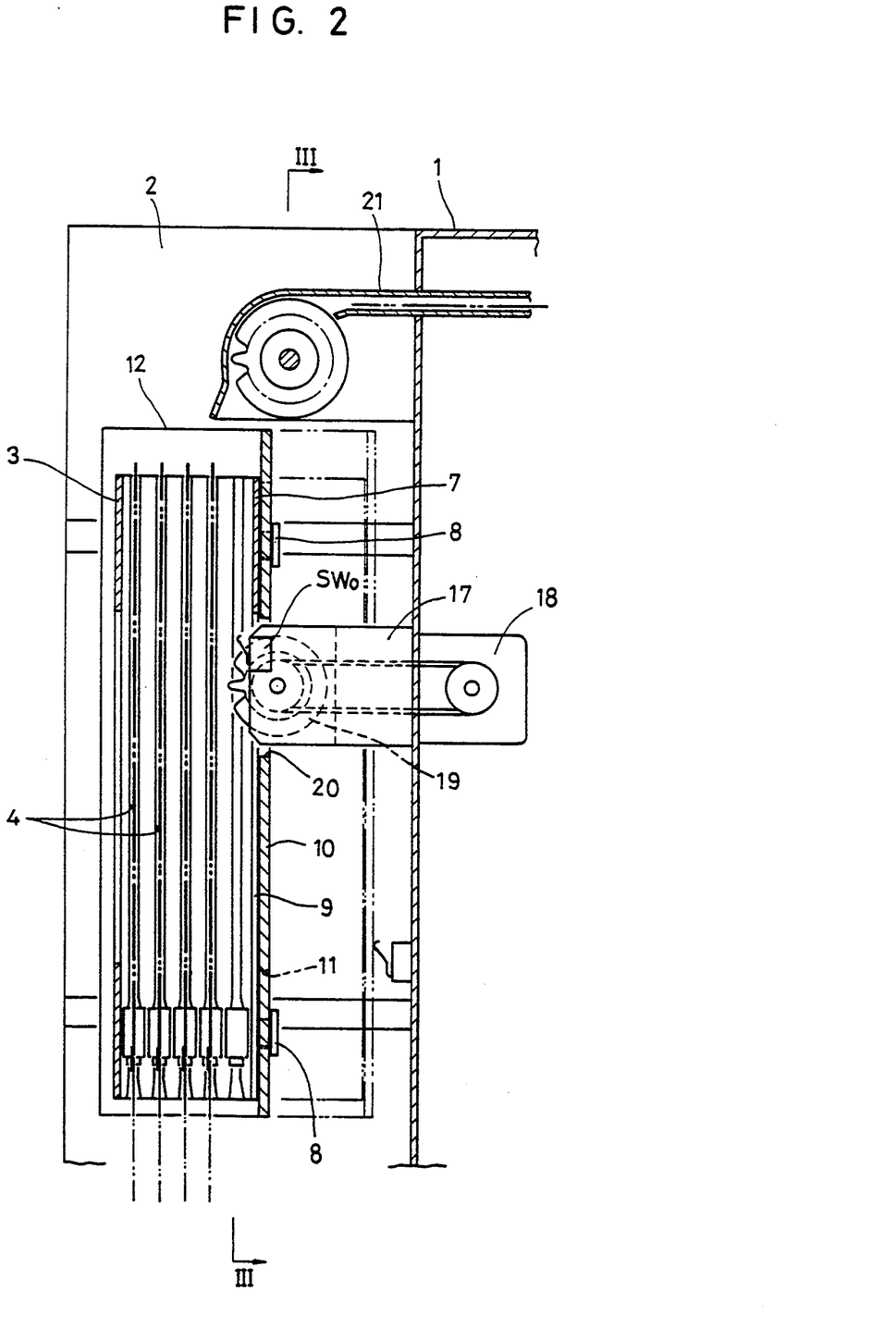
FIG. 2 is a vertical sectional front view of the same showing how the leader stocker is mounted.
Figure 3:
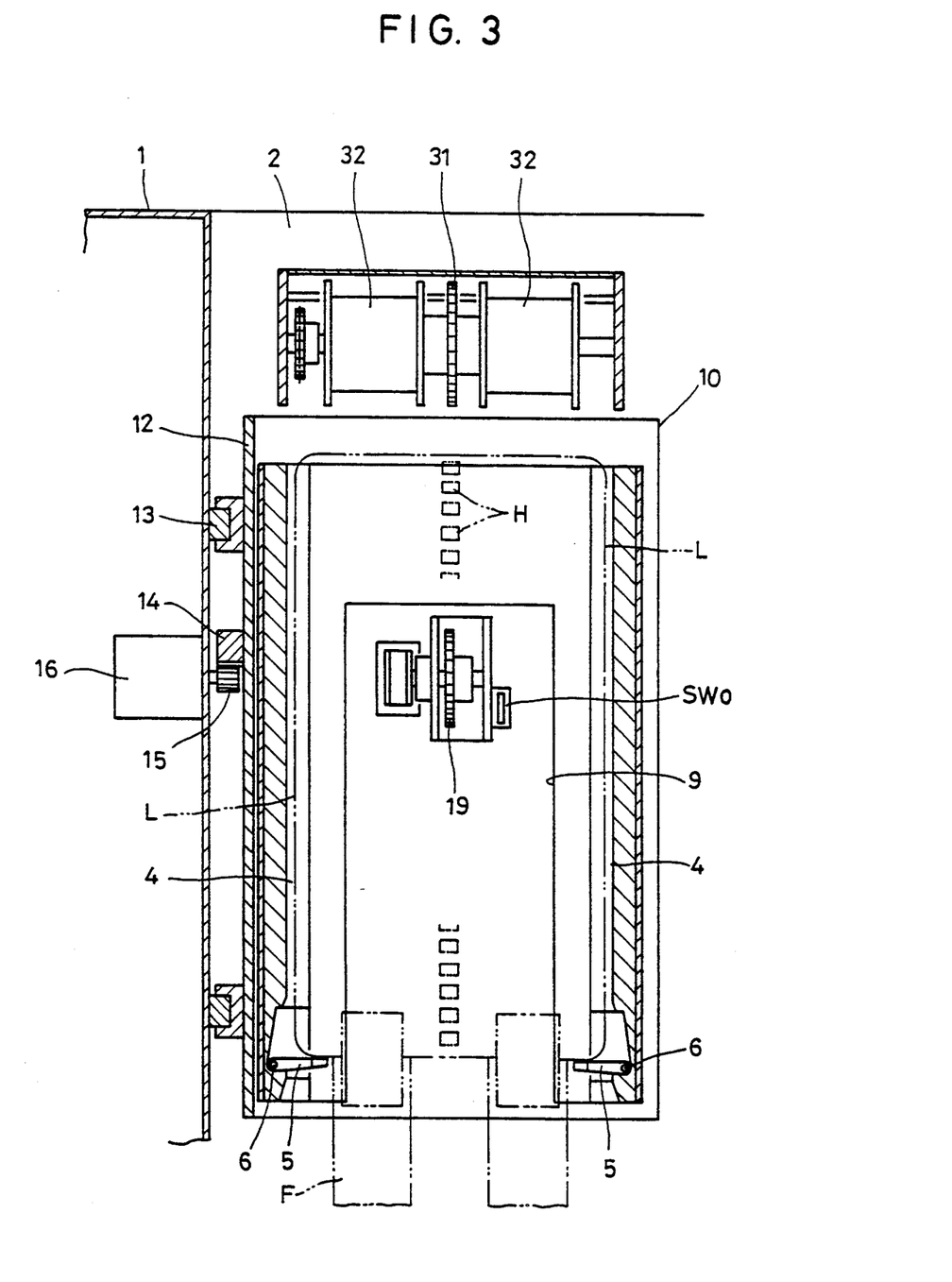
FIG. 3 is a sectional view taken along III—III of FIG. 2.

As shown in FIGS. 2 and 3, the leader stocker 3 is in the form of a rectangular cylinder having on both sides thereof a plurality of pairs of grooves 4 spaced equally from each other to receive leaders. A pair of claws 5 are mounted at the bottom of each groove 4 (FIG. 3).

Each claw 5 is supported pivotably around a pin 6. When the leader L is inserted into the groove 4 from the bottom of the leader stocker 3, the claws 5 are pivoted upward urged by the leader L. After the bottom end of the leader L has passed the claws 5, they are pivoted downwardly by their own weight so that they will support the bottom end of the leader L.

A rear plate 7 of the leader stocker 3 is formed with an opening 9 and has a plurality of engaging pins 8. With the leaders L set in the grooves 4, the leader stocker 3 is detachably mounted in a stocker holder 10 which is provided in the recess 2.

The stocker holder 10 is in the form of a plate and formed with guitar-shaped engaging holes 11. By bringing the engaging pins 8 into engagement with the engaging holes 11, the leader stocker 3 is detachably mounted.

At one side of the stocker holder 10 is attached a side plate 12 which is supported so as to be movable along a rail 13 which is provided at one side of the recess 2.

On the side plate 12 of the stocker holder 10 is mounted a rack 14 to be parallel to the rail 13. A pinion 15 meshes the rack 14 and is driven by a motor 16.

On the front side of the recess 2 in the printer body 1 is provided a sprocket arm 17 having on one end a sprocket 19 which is driven by a motor 18. Part of the outer periphery of the sprocket 19 projects into the leader stocker 3 through a window 20 formed in the stocker holder 10 and the opening 9 of the leader stocker 3, so that the sprocket 19 will be engageable with square holes H formed in the leader L set in the leader stocker 3.

The leader L set in the leader stocker 3 is discharged from the top of the leader stocker 3 by the rotation of the sprocket 19.

If one leader L is fed out of the leader stocker 3, the pinion 15 will be driven by the motor 16 to move the stocker holder 12 rightward in FIG. 2. When the next leader L activates a limit switch SW0 mounted in the sprocket arm 17, the motor 18 will stop. Now the square holes H of the next leader L are in position for engagement with the sprocket 19.

As shown in FIG. 1, the leader L, fed out of the leader stocker 3, is carried along a leader transfer path 21 provided in the printer body 1 and fed to a leader discharge path 78. The developed film is fed to a negative carrier 22 aligned with an exposure axis X.

Figure 4:
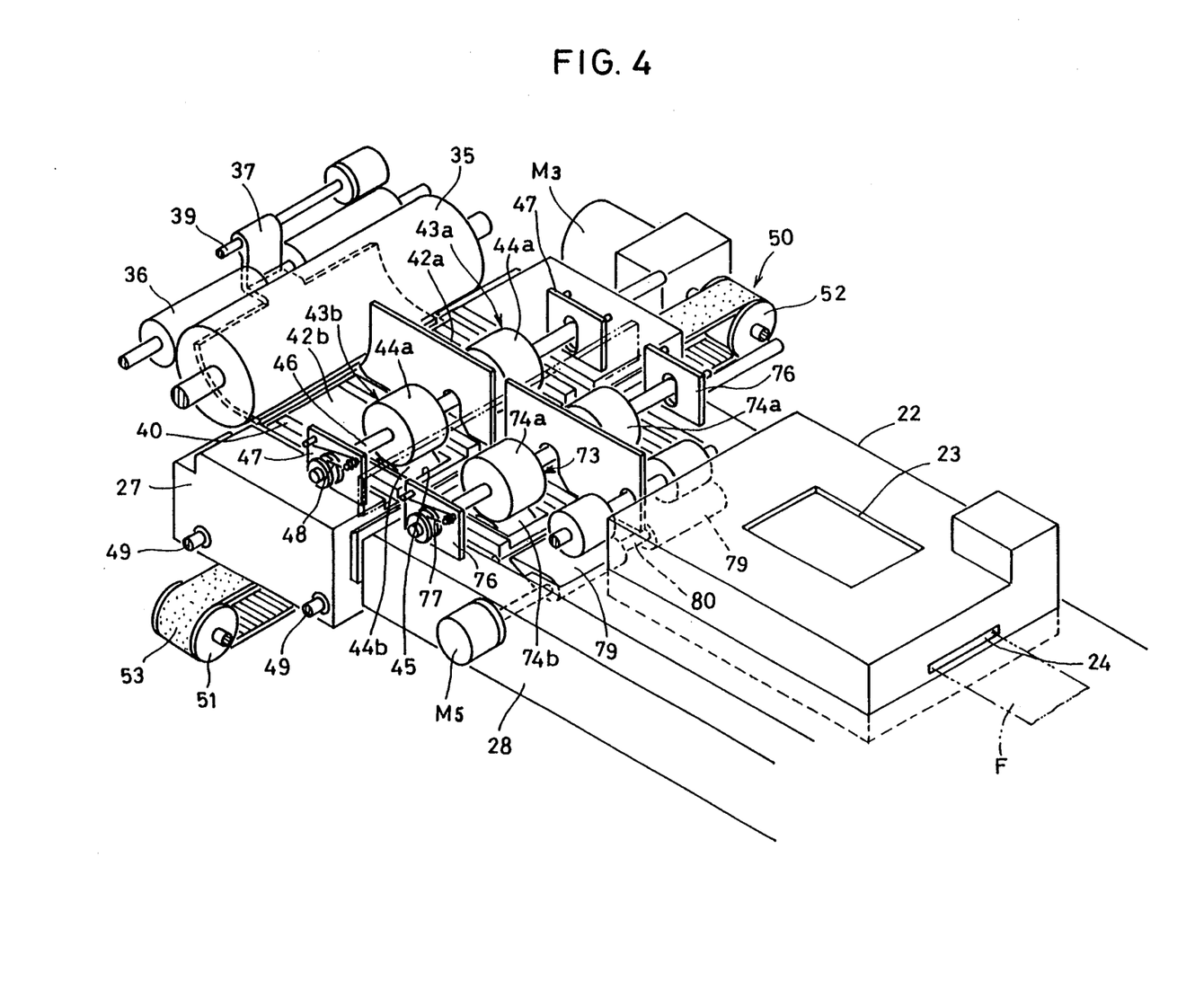
FIG. 4 is a perspective view of a portion of the same.

As shown in FIG. 4, the negative carrier 22 is formed with an exposure window 23 and a film path 24. The image on each image frame of the film F inserted in the film path 24 is, as shown in FIG. 1, illuminated by a light source 25 provided under the negative carrier 22 and printed on a printing paper P through a lens 26.

At the film inlet side of the negative carrier 22 is provided a guide block 27. A table 28 is provided between the guide block 27 and the negative carrier 22.

The leader transfer path 21 from the leader stocker 3 to the guide block 27 includes a first transfer path 21a which feeds upward the leader L from the leader stocker 3, a second transfer path 21b extending in a lateral direction from the first transfer path 21a, and a third transfer path 21c extending vertically from the second transfer path 21b. Along the leader transfer path 21, a plurality of feed units 30 are provided to feed the leader L and the films F to the guide block 27.

The feed units 30 comprises a plurality of rotary members 33 each having a sprocket 31 engageable with square holes H of the leader L, and a roller 32 coaxially provided with the sprocket 31 for guiding the movement of the film F. The rotary members 33 are spaced apart from each other with a distance smaller than the length of the leader L. On the third transfer path 21c, press rollers 34 are brought into contact with the roller 32 in the rotary members 33 so that each rotary member 33 will rotate in one direction driven by a driving unit (not shown).

The leader L, fed downward along the third transfer path 21c, is changed its feed direction by 90 by a turn roller 35 and supplied to the guide block 27.

The turn roller 35 rotates in one direction driven by a driving unit (not shown). The turn roller 35 has, on its one side for guiding the leader L, a guide roller 36 and an arcuate leader guide 37 to introduce the leader L along the outer surface of the turn roller 35. Further, a film stocker 38 is provided under the turn roller 35.

Figure 5:
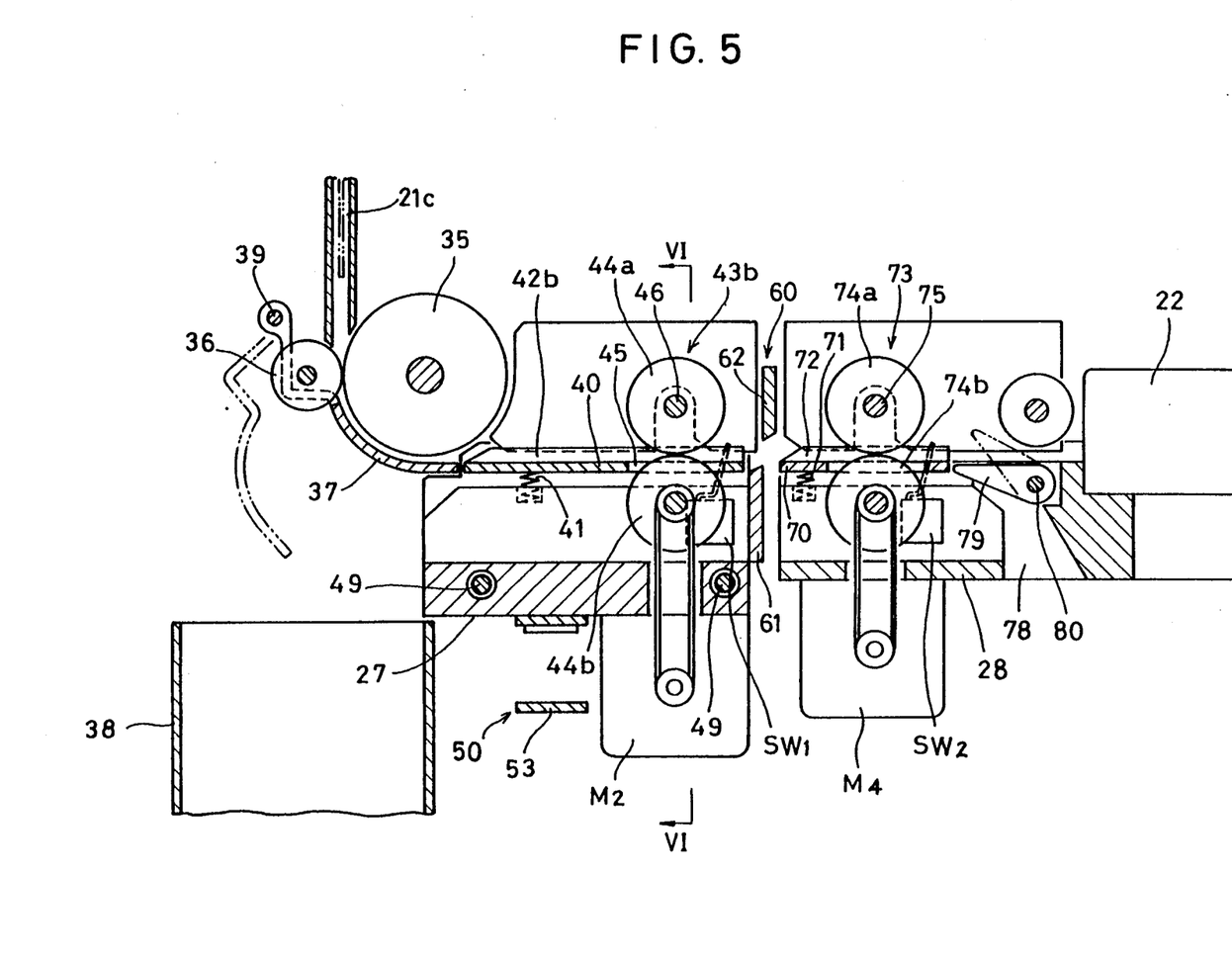
FIG. 5 is a vertical sectional front view of the portion of FIG. 4.

As shown in FIG. 5, the upper portion of the leader guide 37 is pivotably supported around a pin 39. The leader guide 37 pivots around the pin 39 by means of a pivot mechanism (not shown).

Figure 6:
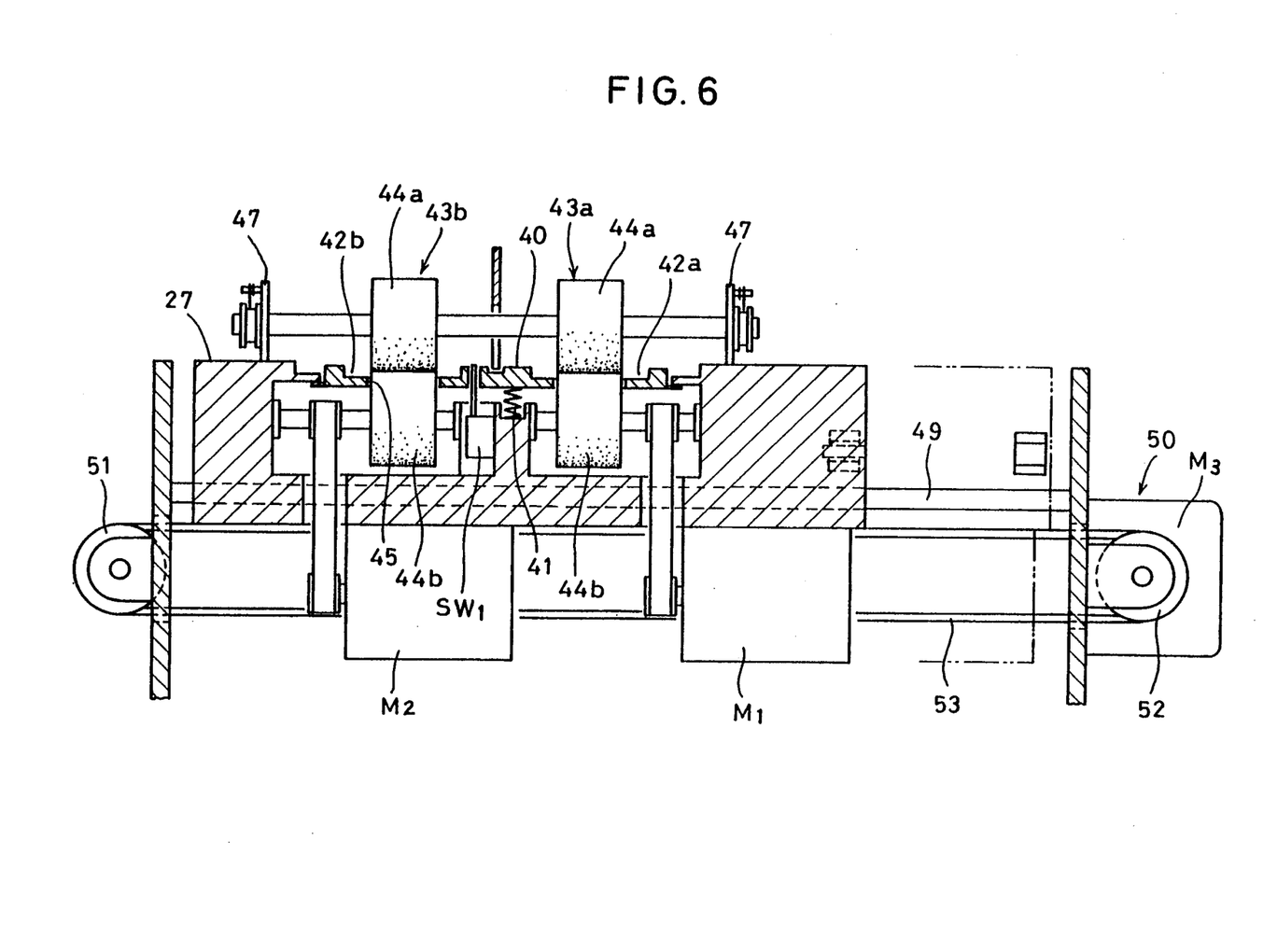
FIG. 6 is a sectional view taken along VI—VI of FIG. 5.

FIGS. 4-6 show the guide block 27 and the table 28 in more detail. The guide block 27 is formed on its top with a film guide 40 which is elastically supported by a spring 41. The film guide 40 includes film passages 42a and 42b extending toward the table 28. The distance between the film passages 42a and 42b is the same as that between the two films F attached to the leader (FIG. 4).

The films F fed in the film passages 42a and 42b are carried toward the table 28 by film feed units 43a and 43b, respectively.

The film feed units 43a and 43b each have a pair of film feed rollers 44a and 44b on its top and bottom. The lower feed rollers 44b have their top surfaces protruding from windows 45 which are formed on the bottom faces of the film passages 42a and 42b, and are separately rotated by motors M1 and M2, respectively, mounted in the guide block 27 (FIG. 5).

The upper film feed rollers 44a are rotatably supported by a roller shaft 46, which has both ends thereof supported by a pair of bearings 47 mounted on both ends of the top face of the guide block 27 so as to be movable vertically.

A spring 48 is provided for each of the bearings 47 to urge the roller shaft 46 downward so that the upper film feed rollers 44a will be pressed against the lower film feed rollers 44b.

A limit switch SW1 is mounted on the guide block 27 upstream of the film feed units 43a and 43b to detect the tip of the leader L (FIG. 5). When the tip of the leader L abuts the limit switch SW1 to switch it on, the pivot mechanism for the leader guide 37 will activate to move the leader guide 37 away from the turn roller 35.

The guide block 27 is supported so as to be movable along two guide rods 49, which extend in a direction perpendicular to the film passages 42a and 42b. The guide block 27 is moved along the guide rods 49, activated by a transfer unit 50.

The transfer unit 50 comprises a pair of pulleys 51 and 52 and a timing belt 53 provided therearound (FIG. 4). The pulley 52 is rotated by a motor M3. Part of the timing belt 53 is fixed to the bottom face of the guide block 27.

Between the guide block 27 and the table 28 is provided a cutter device 60 to cut off the films F from the leader L. The cutter device 60 comprises a lower blade 61 fixed to the front of the guide block 27 and an upper blade 62 which is vertically movable (FIG. 5).

The table 28 is formed on its top with a film guide 70 which is elastically supported by a spring 71. The film guide 70 includes two film passages 72 extending toward the negative carrier 22. One of the film passages 72 is aligned with the film path 24 in the negative carrier 22.

The distance between the film passages 72 is the same as that between the two film passages 42a and 42b formed on the film guide 40 on the guide block 27. A transfer unit 73 for feeding the film F to the negative carrier 22 is provided for each of the film passages 72 (FIG. 5).

The transfer units 73 each have a pair of film feed rollers 74a and 74b arranged one on the other. The lower film feed rollers 74b are rotated by means of a motor M4. The upper feed rollers 74a are rotatably supported on a roller shaft 75, which has both ends thereof supported by a pair of bearings 76 mounted on both ends of the top face of the table 28 so as to be movable vertically.

A spring 77 is provided for each of the bearings 76 to urge the roller shaft 75 downward so that the upper film feed rollers 74a will be pressed against the lower film feed rollers 74b.

A limit switch SW2 is mounted ahead of the transfer units 73 and is turned on when the tip of the leader L abuts it.

A leader guide 79 has its front end fixed by a shaft 80 which is rotatably supported by a table 28 so as to be turnable by a limited angle by means of a motor M5 or solenoid (not shown). When the limit switch SW2 is on, the motor M5 is activated to pivot the leader guide 79 upward.

The operation of the film feed device according to the present invention will be described hereinafter.

As shown in FIG. 1, the leader L in the leader stocker 3 is fed up by the rotation of the sprocket 19, and then along the leader transfer path 21 by means of the feed unit 30.

Since the leader guide 37 is in position along the outer surface of the turn roller 35, the leader L travels along the turn roller 35 guided by the leader guide 37, and changes its direction by 90°.

The leader L then travels further along the film guide 40 formed on the top of the guide block 27. While moving, the film guide 40 sinks against the bias of the spring 41.

Figure 7:
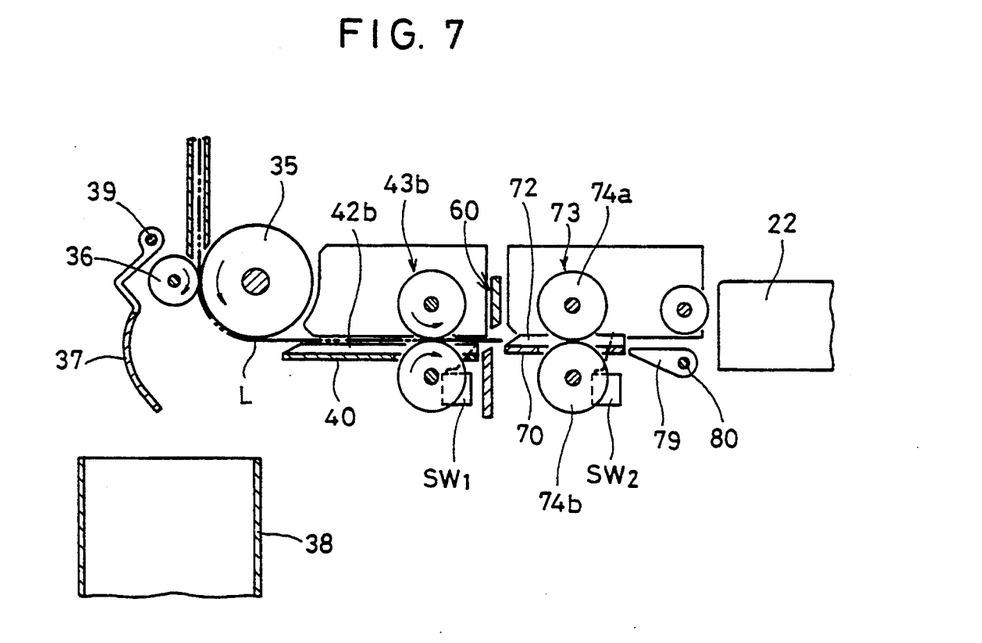
FIGS. 7 and 8 are sectional views of the same showing how it operates.

The leader L is fed further by the film feed units 43a and 43b toward the table 28. As shown in FIG. 7, if the limit switch SW1 is activated by the tip of the leader, the leader guide 37 will pivot around the pin 39 away from the turn roller 35.

The leader L is fed from the film guide 40 formed on the guide block 27 to the film guide 70 on the table 28. While travelling, the film guide 70 sinks against the bias of the spring 71. The leader L is moved further by the transfer units 73 provided on the film passage 72 of the film guide 70.

When the limit switch SW2 mounted ahead of the transfer units 73 is activated by the leader L, the leader guide 79 will pivot upward around the shaft 80.

Figure 8:
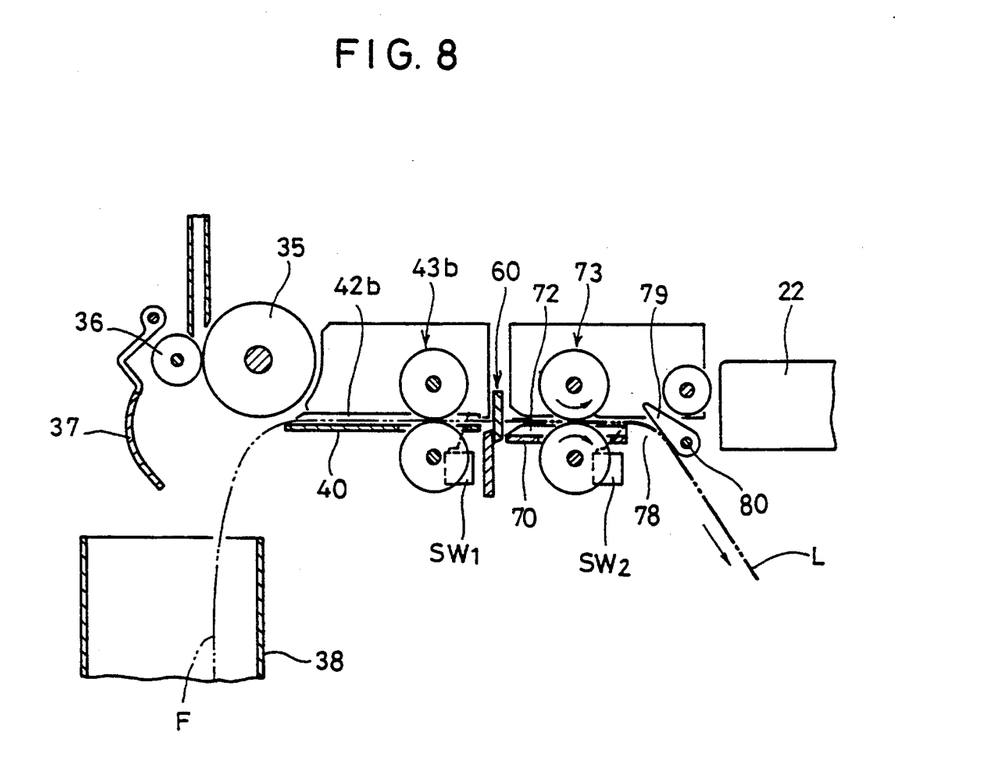

Thus, as shown in FIG. 8, the leader L is guided to a leader discharge path 78 (FIG. 5).

After the rear end of the leader L has reached the limit switch SW1 and turned it off, the film feed units 43a and 43b and the transfer units 73 will stop. At the same time, the film guide 40 on the guide block 27 moves upward, bringing the film F into engagement with the film passages 42a and 42b. Also, the cutter device 60 is activated to cut off the films F.

In this state, since the rear end of the film F in the leader transfer path 21 is fed forward by the transfer unit 30, it will hang down from the turn roller 35 (FIG. 8).

After the film F is cut off, the transfer unit 73 feeds the leader L at a high speed. When the leader L is completely discharged to the leader discharge path 78, the leader guide 79 will pivot downward until its upper face becomes horizontal. Further, the film guide 70 on the table guide 28 will move upward and be kept at the same level as the film guide 40 of the guide block 27.

Figure 9:
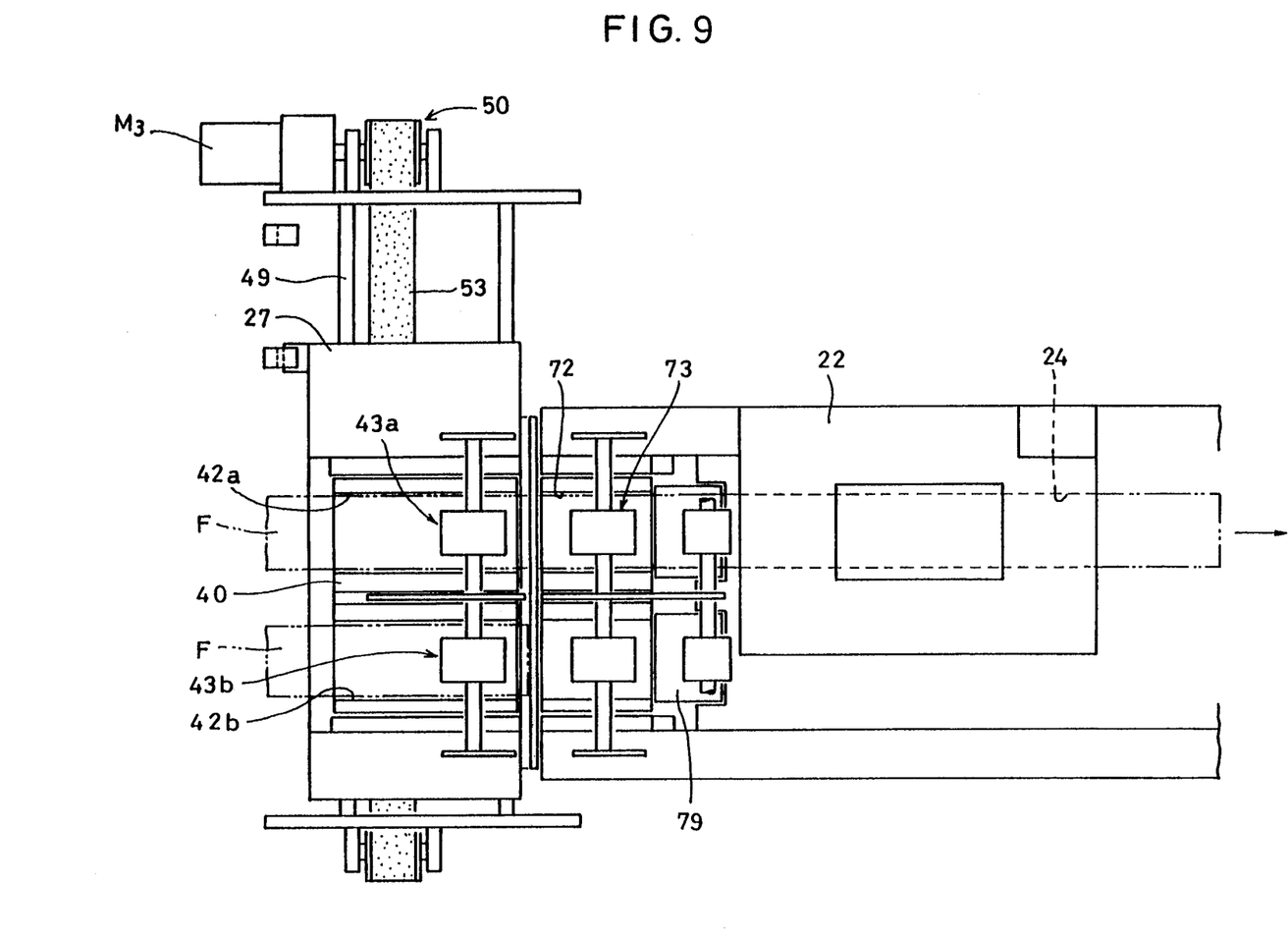
FIGS. 9 and 10 are plan views of the same showing how it operates.

After the leader L has been discharged, the feed speed of the transfer unit 73 returns to normal. At the same time, the film feed unit 43a in the film passage 42a which is aligned with the film path 24 in the negative carrier 22 will operate to feed one of the films F to the negative carrier 22 (FIG. 9).

In this state, the film feed unit 43b in the other film passage 42b halts its operation. The film F whose front end is in the film passage 42b has its rear end hanging down in the film stocker 38 by means of the feed unit 30.

After the one film F fed to the negative carrier 22 has been printed for its entire length, the guide block 27 travels along the guide rod 49, driven by the transfer unit 50.

Figure 10:
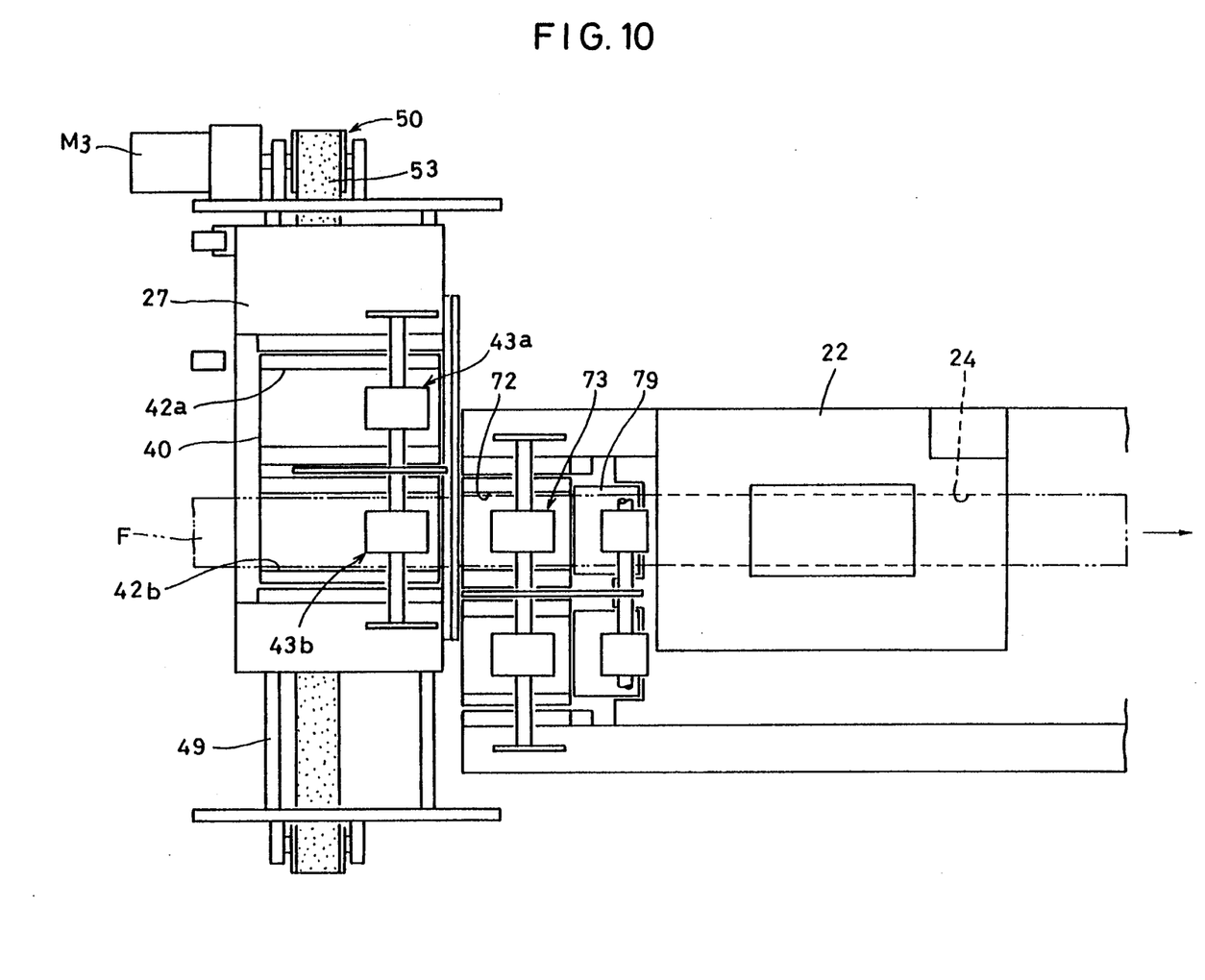

As shown in FIG. 10, after the other film passage 42b has been aligned with the film path 24 in the negative carrier 22, the transfer unit 50 will halt its operation. At the same time, the other film F having its front end fitted in the other film passage 42b is fed toward the negative carrier 22.

As described above, after two films F connected to the leader L has been printed in turn, the next leader L is fed from the leader stocker 3 to the leader transfer path 21. The same operation is then repeated.

In this embodiment, the leader L accommodated in the leader stocker 3 is automatically fed to the leader transfer path 21, but it may be supplied by hand.

What is claimed is:

1. A film feed device for use in a film printing apparatus for feeding films attached to a leader to a negative carrier provided along an exposure axis, said film feed device comprising a guide block provided at a film inlet side of said negative carrier and formed on top thereof with two film passages extending toward said negative carrier, a plurality of feed units for feeding the films connected to the leader to said guide block, a cutter device for cutting off the films from the leader when the rear end of the leader has passed said guide block, a leader discharge means for discharging the leader cut off from the films from a film path, a film feed means for feeding the film from said film passage to said negative carrier, and a transfer means for moving said guide block in a direction perpendicular to the feed direction of the film to align one of said two film passages with said film inlet of said negative carrier.

* * * * *